3,830,759
PROCESS FOR REDUCING DIETHYLENE GLYCOL FORMATION IN POLY(ETHYLENE TEREPHTHALATE) PREPOLYMER

Kenneth T. Barkey, Rochester, N.Y., assignor to Eastman Kodak Company, Rochester, N.Y.
No Drawing. Original application Dec. 2, 1971, Ser. No. 204,365, now Patent No. 3,749,697. Divided and this application Dec. 7, 1972, Ser. No. 313,047
Int. Cl. C08g 53/22, 39/04
U.S. Cl. 260—2.3
6 Claims

ABSTRACT OF THE DISCLOSURE

Formation of contaminant diethylene glycol by-product during manufacture of poly(ethylene terephthalate) prepolymer by ester exchange of dimethyl terephthalate and ethylene glycol in the presence of a catalyst mixture is minimized by including lithium acetate dihydrate as an essential ingredient in the catalyst mixture with zinc acetate dihydrate and/or antimony trioxide.

---

This is a division of application Ser. No. 204,365, filed Dec. 2, 1971, now Pat. No. 3,749,697.

FIELD OF THE INVENTION

This invention relates to the preparation of linear polyester of glycols and terephthalic acid. More particularly, this invention relates to an improved ester interchange process in which glycol is exchanged with the methyl moiety in dimethyl terephthalate in the presence of a catalyst mixture whereby the amount of diethylene glycol which forms as a contaminant by-product in the known prior art process is substantially reduced. The polyester product formed by this improved process has imparted to it physical properties which enhance the subsequent processing of the polyester into a biaxially-oriented film form.

DESCRIPTION OF THE PRIOR ART

The preparation of polyesters such as poly(ethylene terephthalate) and poly(propyleneterephthalate) by ester exchange and condensation is well known. U.S. Pats. 2,465,319, 2,727,881 and 3,488,382 and many others describe such processes in great detail. A common feature of a large number of these processes is that they begin with a lower dialkyl ester of a bifunctional dicarboxylic acid which is condensed with a bifunctional glycol, the glycol usually being used as such although it can be used in the form of lower alkanoic acid ester thereof, such esters being equivalents of the glycol. These processes involve the initial preparation, in the presence of a catalyst, of a substantially monomeric protopolymer under conditions facilitating removal of the lower alkanol formed from the lower dialkyl ester by ester interchange with the glycol. This is sometimes referred to as the "first stage" or the "ester exchange" step of the polyester preparation and can be conducted under a variety of conditions using many different types of apparatus. For example, the lower dialkyl ester and the glycol in a mole ratio beginning at about 1 to 1.5 up to about 1 to 10 are placed in a reaction vessel equipped with a packed column with the vessel being heated at a temperature which permits the lower alkanol to pass through the column, with the glycol being retained by the column and returned to the reaction vessel by refluxing, whereby the lower alkanol is theoretically removed during this first stage of the polyester preparation which results in the formation of a monomeric protopolymer.

The catalysts which may be used in the preparation of polyesters according to the above processes include organic and inorganic compounds of metals such as titanium, manganese, antimony, zinc, tin, lead, calcium, cobalt, lithium, combinations thereof, etc., many of which have heretofore been utilized by those skilled in the art. The prior art, for example, discloses a great number of such catalysts, some of which are described in patents such as U.S. 2,465,319, U.S. 2,720,502, U.S. 2,727,881, U.S. 3,488,382 and others. Specific catalysts heretofore known and which may be utilized include tetraisopropyl titanate, titanium dioxide, zinc acetate, zinc acetyl acetonate, lead oxide, calcium oxide, lithium ethoxide, antimony trioxide, manganese oxides and the like. Generally, the acetates, chlorides, nitrates, sulfates, oxides and alkoxides of one or more of the metals zinc, manganese, tin, lead, titanium, antimony, cobalt and lithium are preferred. For example, the catalyst system of zinc acetate and tetraisopropyl titanate is well suited to attain the desired reaction activity. The catalyst (or catalyst mixture) is generally utilized in a concentration of from about 0.002 percent to about 0.2 percent by weight of the reactants being condensed. Higher or lower percentages can also be employed. Generally from about 0.001 percent to about 0.05 percent catalyst can be advantageously employed. Preferred ester exchange catalysts include, for example, zinc acetate, manganous acetate, cobaltous acetate, lithium acetate, and tetraisopropyl titanate. However, many others are known.

During the "first stage" manufacture of the above type of monomeric protopolymer polyester, specifically poly(ethylene terephthalate) prepolymer, by means of catalytic systems using the above described catalysts, a by-product compound, diethylene glycol (DEG) is formed and reacts with the polyester to form a copolyester which is randomly distributed in the polyester, which itself is a homopolymer, from which copolyester it cannot readily be removed. The copolyester has a lower melting point than does the parent homopolymer polyester and melts over a broader temperature range than does the polyester homopolymer. Furthermore, the copolyester nucleates and crystallizes differently than does the polyester homopolymer. As a result, during subsequent operations involved in the manufacture of a film product from the polyester product containing the copolyester as a contaminant by-product, many problems arise which have an adverse effect upon the quality and uniformity of the film product made therefrom and upon the processing operations necessarily used in making the film. For example, in the manufacture of the film product, the "first stage" polyester product is first melted and then cast to form a readily grindable solid product for use in further polymerization steps. Uniform nucleation and rapid crystal growth are essential for casting of such polyester prepolymer in an opaque readily disintegratable solid form. Presence of the copolyester contaminant in excessive and often varying amounts causes the cast polyester prepolymer to solidify in glassy, amorphous form which is difficult to prebreak of crush, grind and fluidize for the subsequent further polymerization of the polyester prepolymer to a higher degree of polymerization in a "second polymerization stage" in a known manner. The adverse effects of the copolyester contaminant are carried over into the melt from which the film product ultimately is made when the completely polymerized polyester is extruded. Adverse effects such as increased incidents of tear-offs and breaks are encountered during tentering and drafting operations during which the polyester film is biaxially oriented. Prior to the present invention, the only known way to minimize the latter forms of defects was to increase the inherent viscosity (I.V.) of the individual batches of polyester during the second stage of polymerization, thereby causing longer processing times and consequent loss of production capacity.

SUMMARY OF THE INVENTION

The present invention comprises the use in the ester exchange step of polyester preparation of poly(ethylene terephthalate) from dimethyl terephthalate and ethylene glycol of an improved catalyst mixture wherein lithium in the form of a salt of an organic acid, e.g. lithium acetate dihydrate, is used in a buffering amount in a two or three part catalyst system with catalytic amounts of zinc, antimony or zinc-antimony catalyst. Preferably, the improved catalyst mixture consists essentially of lithium:zinc:antimony in the ratio by parts per million (p.p.m.) of dimethyl terephthalate (DMT) charged to the reactor of about 20:65:300, preferably in the forms of lithium acetate dihydrate, zinc acetate dihydrate, and antimony trioxide, respectively. In the latter forms, the amounts of the ingredients used in the catalyst mixture, taken as percents of the weight of DMT charged, will be about 0.03% lithium acetate dihydrate, about 0.02% zinc acetate dihydrate and about 0.035% antimony trioxide, or about 0.12 parts lithium acetate dihydrate, 0.08 parts zinc acetate dihydrate, and about 0.14 parts of antimony trioxide per 388 parts of dimethyl terephthalate charged to the reactor.

The polyester prepolymer formed as a result of the practice of the present invention is characterized in that the amount of diethylene glycol present in the "first stage" polyester product is advantageously lower than that present in corresponding prior art product, and the melting point of the "first stage" polyester prepolymer product is significantly higher than that of the corresponding prior art product, using in each prior case a catalyst mixture consisting of zinc and/or antimony compounds. The polyester prepolymer product is characterized in that it has advantageously improved casting, grinding and fluidization properties for the further manufacture of poly(ethylene terephthalate) powder, which powder subsequently is melt extruded into film form, drafted and tentered to form a biaxially-oriented poly(ethylene terephthalate) film support in a known way for use in manufacture of photographic film products.

The following examples illustrate the advantages of a preferred embodiment of the invention over the prior art practice.

TABLE I

| Ingredients | Example 1 | Example 2 |
| --- | --- | --- |
| Dimethyl terephthalate, grams | [1] 388 | [1] 388 |
| Ethylene glycol, grams | [2] 248 | [2] 248 |
| Zinc p.p.m.* (charged as zinc acetate dihydrate) | 65 | 65 |
| Antimony p.p.m.* (charged as antimony trioxide) | 300 | 300 |
| Lithium, p.p.m.* (charged as lithium acetate dihydrate) | | 21 |

[1] 2 moles. [2] 4 moles.
*Based on weight of dimethyl terephthalate charged to reactor.

TABLE II.—PROCESS DATA AND PROPERTIES OF POLY(ETHYLENE TEREPHTHALATE) PREPOLYMER

| | Example 1 | Example 2 |
| --- | --- | --- |
| Time to complete ester exchange reaction to form prepolymer, min | 44 | 26 |
| Inherent viscosity of prepolymer | 0.44 | 0.43 |
| Carboxyl radical content, meq./kg | 36 | 14 |
| Melting point (°C.) | 256 | 260–261 |
| Diethylene glycol content, mole percent of prepolymer | 3.5 | 1.5 |

Thus, it is evident from comparison of the Process Data and Properties of Poly(ethylene terephthalate) Prepolymers (Table II) made by the prior art method (Example 1) in the absence of lithium acetate dihydrate in the catalyst mixture and the method of the present invention (Example 2) wherein lithium acetate dihydrate is present in the catalyst mixture that the use of only a buffering amount of lithium acetate dihydrate (Table I, Example 2) has reduced the reaction time for the ester exchange reaction by 18 minutes, from 44 minutes to 26 minutes. Also, while the inherent viscosity of the prepolymer polyester has not been significantly affected, i.e. 0.44 and 0.43, the carboxyl radical content, which under normal circumstances is indicative of presence of diethylene glycol, has been reduced greatly, from 36 to 14 mole equivalent (meq.) per kilogram (kg.) of prepolymer polyester. Further, the melting point of the poly(ethylene terephthalate) prepolymer (prepolymer polyester) has advantageously been raised from 256° C. to 260–261° C. by practice of the present invention. And, finally, the actual amount of diethylene glycol present in said prepolymer polyester has been reduced by two full percentage points, i.e., from 3.5 mole percent to 1.5 mole percent in the prepolymer polyester. In practice of the invention, it has been found that lowering of the mole percent of diethylene glycol present by one mole percent results in an increase in melting point of the polyester prepolymer by 2.15° C. In the present example, a reduction of 2 mole percent in diethylene glycol content of the polyester prepolymer has resulted in a 4 to 5° C. increase in melting point. The prepolymer polyester thus has physical property characteristics which one skilled in the art of polycondensing the polyester prepolymer to the polyester and the manufacture of the so-obtained poly(ethylene terephthalate) into film form by known prior art methods will readily recognize as advantageous for the forming of biaxially-oriented film therefrom.

Procedures for carrying out the polycondensation process and procedures for forming biaxially-oriented film from poly(ethylene terephthalate) are described, for example, in U.S. 3,043,564 and U.S. 3,048,564, and such procedures may be used to make the polyester and to make biaxially-oriented film from the poly(ethylene terephthalate) of the present invention. When the poly(ethylene terephthalate) of the present invention is being tentered and drawn for the making into film, the adverse effects discussed above, e.g. tearoffs and breaks, are found to be absent or considerably reduced in frequency.

While the amount of lithium used in practice of the invention has been shown in Example 2 to be 21 p.p.m. of lithium as Li (equivalent to 0.1176 g. of lithium acetate dihydrate) in a reaction mixture of two gram moles of dimethyl terephthalate with four gram moles of ethylene glycol, resulting in the formation of two gram moles of poly(ethylene terephthalate) prepolymer, the advantageous results of the invention also may be obtained by the use of from about 15 to about 60 p.p.m. of lithium as Li (equivalent to about 0.078 g. to about 0.340 g. of lithium acetate dihydrate) in a reaction mixture of two gram moles (388 g.) of dimethyl terephthalate with four gram moles (248 g.) of ethylene glycol. The amounts of antimony catalyst then used may range from about 100 p.p.m. to about 500 p.p.m. (equivalent to from about 0.046 g. to about 0.230 g. of antimony trioxide) in the same reaction mixture. The amounts of zinc catalyst then used may range from about 32 p.p.m. to about 130 p.p.m. (equivalent to from about 0.042 g. to about 0.168 g. of zinc acetate dihydrate) in the same reaction mixture.

Preferably, the improved catalyst mixture of this invention will consist of 65 p.p.m. of zinc, 300 p.p.m. of antimony and from 21 to 35 p.p.m. of lithium in the form of the equivalent amounts of zinc acetate dihydrate, antimony trioxide and lithium acetate dihydrate, respectively, based on the weight of dimethyl terephthalate charged to the reactor.

EXAMPLE 3

The advantageous effect of the use of a buffering amount of lithium in the zinc-antimony catalyst mixture has been found to be obtained also when recycled ethylene glycol from the poly(ethylene terephthalate) prepolymer recovery system is used for manufacture of more of the polyester prepolymer with a new supply of dimethyl terephthalate.

Recycled ethylene glycol recovered from a previous poly(ethylene terephthalate) prepolymer reaction mass is used in the ester exchange reaction in a subsequent batch. Water (2–4 percent) is a major contaminant of such ethylene glycol. A high melting point for the polyester prepolymer is indicative of low diethylene glycol content in the prepolymer. The melting point raising effect of the use of lithium (as lithium acetate dihydrate) in the catalyst system for the preparation of poly(ethylene terephthalate) prepolymer from recycled ethylene glycol along with new dimethylene terephthalate is shown in the following laboratory batches of Table III.

TABLE III

| Batch number | P.p.m. catalyst | | | Prepolymer, inherent viscosity | Melting point (° C.) |
| --- | --- | --- | --- | --- | --- |
| | Zn [1] | Sb [2] | Li [3] | | |
| 1a | 65 | 300 | 0 | 0.43 | 256 |
| 1b | 65 | 300 | 21 | 0.42 | 258 |
| 2a | 65 | 300 | 0 | 0.43 | 257 |
| 2b | 65 | 300 | 21 | 0.42 | 259 |

[1] Charged as zinc acetate dihydrate.
[2] Charged as antimony trioxide.
[3] Charged as lithium acetate dihydrate.

From the data it is seen that the use of Li (lithium acetate dihydrate) gave poly(ethylene terephthalate) prepolymer melting 2° C. higher in each batch (1b and 2b) where it was present as compared to those batches where lithium was absent (1a and 2a), and is indicative of the fact that less diethylene glycol was formed even with water present in the glycol.

The advantageous effects of the presence of lithium in the catalyst mixture for reducing the content of contaminant diethylene glycol in the prepolymer polyester have also been found to be obtained when lithium is used in combination with zinc as the only other catalytic material in the catalyst system or in combination with antimony as the only other catalytic material in the catalyst system. Examples 4 and 5 further illustrate such advantageous results obtained by practice of the invention. In the examples it is to be noted again that the obtainment of a higher melting point for the prepolymer polyester is indicative of the lowering of the diethylene glycol content in the polyester.

EXAMPLE 4

Distilled monomer (250 g.) (i.e. poly(ethylene terepthalate) prepolymer) separated from poly(ethylene terephthalate) prepolymer in a recovery still and containing 280 p.p.m. of zinc and 150 p.p.m. of antimony catalysts (based on weight of monomer charged) was reacted additionally with new dimethyl terephthalate (388 g.) and additional new ethylene glycol. In batch "a," 300 p.p.m. of Sb were added (as $Sb_2O_3$); in batch "b," 21 p.p.m. of Li (charged as lithium acetate dihydrate) and 300 p.p.m. of Sb (as $Sb_2O_3$) were added. The results obtained are shown in Table IV.

TABLE IV

| Batch number | P.p.m. added catalysts | | Properties of prepolymer | | |
| --- | --- | --- | --- | --- | --- |
| | Li | Sb | I.V.* | COOH (meq./kg.) | M.P. (° C.) |
| a | 0 | 300 | 0.42 | 29 | 256 |
| b | 21 | 300 | 0.41 | 15 | 258 |

*Inherent viscosity.

From the data, it is to be noted that inclusion of lithium in the catalyst mixture again caused lesser amounts of diethylene glycol to form (higher melting point) and lesser polyester acidity as evidenced by lower carboxyl content (15 meq./kg. of COOH versus 29 meq./kg. of COOH) for the poly(ethylene terephthalate) prepolymer.

EXAMPLE 5

The recovery of waste poly(ethylene terephthalate) from film manufacturing operations is an ecological and economical necessity. Practice of the invention in such recovery is shown by the following data.

Scrap poly(ethylene terephthalate) from film manufacturing operations was subjected to glycolysis reactions to obtain polyester of lower molecular weight for reprocessing to film grade poly(ethylene terephthalate). Various catalyst systems were used to accelerate the breakdown of the polyester and to minimize diethylene glycol formation. The scrap poly(ethylene terephthalate) had the following characteristics before glycolysis:

TABLE V

Inherent viscosity (I.V.) _____ 0.65
Carboxyl (COOH), meq./kg. _____ 35
Melting Point, ° C. _____ 257

In each of the following batches, A–D, 300 g. of poly(ethylene terephthalate) were reacted with 450 g. of ethylene glycol (1.5 weight ratio of ethylene glycol to scrap poly(ethylene terephthalate)) at the boiling point (198–205° C.). Times necessary to give clear solutions varied depending upon the catalyst system and its concentration. After the scrap had been dissolved and reacted to low molecular weight oligomers, excess ethylene glycol was distilled off and the melt was polymerized for two hours at 260° C. and at a pressure of less than 100 microns (0.1 mm. Hg). The resulting poly(ethylene terephthalate) prepolymer was cast and analyzed. The resulting data are shown in Table VI.

TABLE VI

| Batch number | P.p.m. catalyst | | Glycolysis, minutes | After two hrs. of melt polymerization | | |
| --- | --- | --- | --- | --- | --- | --- |
| | Zn [1] | Li [2] | | I.V. | COOH | M.P. (° C.) |
| A | 0 | 0 | 160 | 0.15 | 67 | 225 |
| B | 162 | 0 | 35 | 0.20, 0.18 | 137 | 243 |
| C | 0 | 52 | 75 | 0.13 | 62 | 237 |
| D | 162 | 52 | 30 | 0.15 | 91 | 245 |

[1] Charged as zinc acetate dihydrate.
[2] Charged as lithium acetate dihydrate.

To eliminate the effect of low molecular weight, as evidenced by the inherent viscosity (I.V.) of the prepolymer and its melting point, batches B and D were polymerized further by solid phase buildup at 210° C. for seven hours. The results obtained are shown in Table VII.

TABLE VII

| Batch number | P.p.m. catalyst | | 0 hour | | 1 hour | | 2 hours | | 5 hours | | 7 hours | | M.P (° C.) |
| --- | --- | --- | --- | --- | --- | --- | --- | --- | --- | --- | --- | --- | --- |
| | Zn [1] | Li [2] | I.V. | COOH (meq./kg.) | I.V. | COOH (meq./kg.) | I.V. | COOH (meq./kg.) | I.V. | COOH (meq./kg.) | I.V. | COOH (meq./kg.) | |
| B | 162 | 0 | 0.18 | 137 | 0.26 | 77 | 0.31 | 68 | ____ | 48 | 0.41 | 53 | 247 |
| D | 162 | 52 | 0.15 | 91 | 0.21 | 64 | 0.27 | 54 | 0.34 | 46 | 0.36 | 38 | 253 |

[1] Charged as zinc acetate dihydrate.
[2] Charged as lithium acetate dihydrate.

From the data in Table VII, it is to be noted that after polymerization for 7 hours in each batch, batch D, which had 52 p.p.m. of lithium present along with 162 p.p.m. of zinc in the catalyst mixture, resulted in a recycled poly(ethylene terephthalate) product having COOH content of 38 meq./kg., compared to original COOH content of 35 meq./kg. in the scrap polyester and a melting point of 253 compared to the original of 257° C. The results from batch B show that in the absence of lithium, the zinc catalyst alone gave polyester product which had 53 meq./kg. of COOH (compared to 38 for D) and a melting point of only 247 (7.5 mole percent DEG) compared to 253° C. (5 mole percent DEG). Therefore, it is evident that use of lithium acetate dihydrate in the catalyst mixture is advantageous for the scrap polyester recovery process as well as for the manufacture of fresh poly(ethylene terephthalate) prepolymer. The recycled prepolymer is in a form suitable for polycondensation to a poly(ethylene terephthalate) which can be made into a useful film product.

As used throughout this description, it is to be understood that the inherent viscosity (I.V.) of poly(ethylene terephthalate) prepolymer is in the range of about 0.40 to 0.44 and the inherent viscosity of polycondensed polyester, i.e. poly(ethylene terephthalate) is in the range of about 0.60 to 0.65.

Although the nature of the activity of the lithium acetate dihydrate in inhibiting the formation of diethylene glycol in accordance with the invention is not definitely known, it is believed that the acidity of the reaction mass is in some manner affected. However, when experiments similar to those given in the examples were carried out using sodium acetate as a substitute for the lithium acetate in the catalyst mixture of the invention the results obtained were not as good and, in addition, the biaxially-oriented films made from the sodium acetate experiments were found to be hazy and not clear as were those obtained when lithium acetate dihydrate was used in the catalyst mixtures of the invention.

The invention has been described in detail with particular reference to preferred embodiments thereof, but it will be understood that variations and modifications can be effected within the spirit and scope of the invention.

I claim:

1. In a process for recovering waste poly(ethylene terephthalate) from film making operations by glycolysis of said waste with ethylene glycol at an elevated temperature in the presence of a catalyst to form poly(ethylene terephthalate) in the form of low molecular weight oligomers; the improvement which comprises carrying out said glycolysis in the presence of a catalyst mixture consisting essentially of (a) a diethylene glycol formation inhibiting amount of lithium acetate dihydrate with (b) a catalytic amount of at least one of zinc acetate dihydrate or antimony trioxide.

2. The process of claim 1 wherein said catalyst mixture contains (a) about 15 to about 60 p.p.m. of lithium, (b) 0 to about 500 p.p.m. of antimony, and (c) 0 to about 130 p.p.m. of zinc, based on the weight of waste poly(ethylene terephthalate) charged to the reactor.

3. The process of claim 2 wherein said catalyst mixture contains (a) about 21 to 35 p.p.m. of lithium (b) about 65 p.p.m. of zinc and (c) about 300 p.p.m. of antimony.

4. The process of claim 2 wherein said catalyst mixture contains (a) about 21 p.p.m. of lithium, (b) about 65 p.p.m. of zinc and (c) about 300 p.p.m. of antimony.

5. The process of claim 2 wherein the catalyst mixture contains about 52 p.p.m. of lithium and about 162 p.p.m. of zinc.

6. The process of claim 2 wherein said low molecular weight oligomers are further polymerized by solid phase buildup at polymerizing temperature to increase their inherent viscosity to a viscosity in the range of about 0.60 to about 0.65.

References Cited

UNITED STATES PATENTS

| 3,344,091 | 9/1967 | Russin et al. | 260—2.3 |
| 3,501,420 | 3/1970 | Stevenson | 260—2.3 |

WILBERT J. BRIGGS, Sr., Primary Examiner

U.S. Cl. X.R.

252—426, 430; 260—75 R, 475 D, 475 P